(12) United States Patent
Ruckdaeschel et al.

(10) Patent No.: US 11,787,093 B2
(45) Date of Patent: Oct. 17, 2023

(54) PROCESS AND TOOL FOR CONTINUOUS PRODUCTION OF FIBER-REINFORCED FOAMS

(71) Applicant: BASF SE, Ludwigshafen am Rhein (DE)

(72) Inventors: Holger Ruckdaeschel, Ludwigshafen am Rhein (DE); Maria-Kristin Sommer, Ludwigshafen am Rhein (DE); Rene Arbter, Ludwigshafen am Rhein (DE); Sebastian Koltzenburg, Ludwigshafen am Rhein (DE)

(73) Assignee: BASF SE (Ellwanger & Baier Patentanwälte), Ludwigshafen am Rhein (DE)

( * ) Notice: Subject to any disclaimer, the term of this patent is extended or adjusted under 35 U.S.C. 154(b) by 579 days.

(21) Appl. No.: 16/328,089

(22) PCT Filed: Aug. 9, 2017

(86) PCT No.: PCT/EP2017/070180
§ 371 (c)(1),
(2) Date: Feb. 25, 2019

(87) PCT Pub. No.: WO2018/036821
PCT Pub. Date: Mar. 1, 2018

(65) Prior Publication Data
US 2019/0184611 A1    Jun. 20, 2019

(30) Foreign Application Priority Data

Aug. 26, 2016 (EP) ..................................... 16185828

(51) Int. Cl.
  *B29C 44/50*    (2006.01)
  *B29C 44/46*    (2006.01)
  (Continued)

(52) U.S. Cl.
  CPC ............ *B29C 44/50* (2013.01); *B29B 15/122* (2013.01); *B29C 44/02* (2013.01); *B29C 44/461* (2013.01);
  (Continued)

(58) Field of Classification Search
  CPC ..... B29C 44/50; B29C 44/461; B29C 70/086; B29C 70/50; B29C 44/02; B29C 44/32;
  (Continued)

(56) References Cited

U.S. PATENT DOCUMENTS

| 3,246,058 A | 4/1966 | Voelker |
| 5,866,051 A | 2/1999 | Lin et al. |

(Continued)

FOREIGN PATENT DOCUMENTS

| CN | 101804689 A | * | 8/2010 |
| WO | WO-03024705 A1 | | 3/2003 |

(Continued)

OTHER PUBLICATIONS

Merriam-Webster, Inlet, accessed Jan. 6, 2022 (Year: 2022).*
(Continued)

*Primary Examiner* — Francisco W Tschen
*Assistant Examiner* — Elisa H Vera
(74) *Attorney, Agent, or Firm* — Faegre Drinker Biddle & Reath LLP

(57) ABSTRACT

The present invention relates to a tool (W) having at least one first inlet opening (E1) and at least one second inlet opening (E2), and also at least one first outlet opening (A1), at least one second outlet opening (A2) and at least one third outlet opening (A3), wherein the second outlet opening (A2) and the third outlet opening (A3) alternate with the first outlet opening (A1). The present invention further relates to a process for producing a fiber/foam composite by extruding (Continued)

through the tool (W) and to the use of the tool (W) for production of a fiber/foam composite by extrusion.

13 Claims, 4 Drawing Sheets

(51) Int. Cl.
| | |
|---|---|
| *B29C 44/32* | (2006.01) |
| *B29K 105/08* | (2006.01) |
| *B29B 15/12* | (2006.01) |
| *B29C 70/08* | (2006.01) |
| *B29C 70/50* | (2006.01) |
| *B29C 44/02* | (2006.01) |
| *B29K 75/00* | (2006.01) |
| *B29K 77/00* | (2006.01) |
| *B29K 27/06* | (2006.01) |
| *B29K 69/00* | (2006.01) |
| *B29K 101/12* | (2006.01) |

(52) U.S. Cl.
CPC .......... *B29C 70/086* (2013.01); *B29C 70/50* (2013.01); *B29C 44/32* (2013.01); *B29C 44/3215* (2016.11); *B29K 2027/06* (2013.01); *B29K 2069/00* (2013.01); *B29K 2075/00* (2013.01); *B29K 2077/00* (2013.01); *B29K 2101/12* (2013.01); *B29K 2105/08* (2013.01)

(58) Field of Classification Search
CPC .............. B29C 44/3215; B29B 15/122; B29K 2075/00; B29K 2077/00; B29K 2027/06; B29K 2069/00; B29K 2101/12; B29K 2105/08

See application file for complete search history.

(56) References Cited

U.S. PATENT DOCUMENTS

| | | | |
|---|---|---|---|
| 6,206,669 B1 | 3/2001 | Lewit et al. | |
| 2009/0098237 A1* | 4/2009 | Itadani | B29C 48/08 425/464 |
| 2011/0268923 A1* | 11/2011 | Suzuki | B29C 45/0013 428/156 |
| 2012/0313280 A1* | 12/2012 | Wardle | B29C 44/22 264/54 |
| 2017/0285619 A1* | 10/2017 | Brennan | B33Y 50/02 |
| 2017/0291390 A1 | 10/2017 | Daun et al. | |
| 2017/0361545 A1 | 12/2017 | Ruckdaschel et al. | |
| 2017/0369667 A1 | 12/2017 | Ruckdaschel et al. | |
| 2018/0009960 A1 | 1/2018 | Ruckdaschel et al. | |
| 2018/0194897 A1 | 7/2018 | Desbois et al. | |
| 2018/0257345 A1 | 9/2018 | Ruckdaschel et al. | |

FOREIGN PATENT DOCUMENTS

| | | |
|---|---|---|
| WO | WO-2012025165 A1 | 3/2012 |
| WO | WO-2013053666 A1 | 4/2013 |
| WO | WO-2016142480 A1 | 9/2016 |
| WO | WO-2017016995 A1 | 2/2017 |
| WO | WO-2017045988 A1 | 3/2017 |
| WO | WO-2017202667 A1 | 11/2017 |
| WO | WO-2017202668 A1 | 11/2017 |
| WO | WO-2017202669 A1 | 11/2017 |
| WO | WO-2017202671 A1 | 11/2017 |
| WO | WO-2017202672 A1 | 11/2017 |
| WO | WO-2018036821 A1 | 3/2018 |
| WO | WO-2018037016 A1 | 3/2018 |

OTHER PUBLICATIONS

Merriam-Webster, Outlet accessed Jan. 6, 2022 (Year: 2022).*
English Translation of CN101804689A provided by Espacenet accessed Jun. 23, 2022 (Year: 2022).*
Merriam-Webster, Flat, retrieved Jan. 13, 2023, url: https://www.merriam-webster.com/dictionary/flat (Year: 2023).*
U.S. Appl. No. 16/328,114, filed Feb. 25, 2019, Daun et al.
International Preliminary Report On Patentability with Written Opinion for PCT Application No. PCT/EP2017/070180, dated Mar. 13, 2019.
Penczek et al., "Unsaturated Polyester Resins: Chemistry and Technology", Advances in Polymer Science, vol. 184; pp. 1-95, 2005.
International Search Report for PCT/EP2017/070180 dated Nov. 27, 2017.
Written Opinion of the International Searching Authority for PCT/EP2017/070180 dated Nov. 27, 2017.

* cited by examiner

PROCESS AND TOOL FOR CONTINUOUS PRODUCTION OF FIBER-REINFORCED FOAMS

CROSS-REFERENCE TO RELATED APPLICATIONS

This application is a national stage application (under 35 U.S.C. § 371) of PCT/EP2017/070180, filed Aug. 9, 2017, which claims benefit of European Application No. 16185828.7, filed Aug. 26, 2016, both of which are incorporated lo herein by reference in their entirety.

The present invention relates to a tool (W) having at least one first inlet opening (E1) and at least one second inlet opening (E2), and also at least one first outlet opening (A1), at least one second outlet opening (A2) and at least one third outlet opening (A3), wherein the second outlet opening (A2) and the third outlet opening (A3) alternate with the first outlet opening (A1). The present invention further relates to a process for producing a fiber/foam composite by extruding through the tool (W) and to the use of the tool (W) for production of a fiber/foam composite by extrusion.

Fiber/foam composites, also referred to in the art as reinforced foams or fiber-reinforced foams, are of major industrial significance since they have high strength and stiffness with simultaneously low weight. Therefore, fiber/foam composites are of particular interest for components that are to be as light as possible and nevertheless extremely mechanically stable. For example, fiber/foam composites are used for components of boats and ships and of cars. They are also used as the core of rotor blades in wind turbines. For use in components of this kind, fiber/foam composites are to have good mechanical properties, especially high shear rigidity, in all three spatial directions if at all possible.

The prior art discloses various processes for production of fiber/foam composites.

U.S. Pat. No. 6,206,669 describes an apparatus for continuous production of a reinforced foam consisting of an internal foam and an external fiber material. The outer fiber material consists of at least two layers, one layer having a reinforcing effect and the other being a nonwoven. The fiber material is introduced into the apparatus in such a way that it forms a kind of tube into which a foamable polymer is injected and then forms the internal foam by foaming. The internal foam adheres to the fiber material in that it penetrates into the meshes of the nonwoven. In the apparatus described in U.S. Pat. No. 6,206,669, it is absolutely necessary that the foamable polymer is injected into the cavity formed by the fiber material. It is not possible with this apparatus to surround the fiber material with the foam. In other words, it is not possible with the apparatus according to U.S. Pat. No. 6,206,669 to embed the fiber material into the foam. This is considered to be disadvantageous since a reinforced foam has a high strength and rigidity especially when the fiber material is embedded into the foam. Good mechanical properties are achieved in all three spatial directions particularly when the fiber material is not embedded in a planar manner into the foam, but when the fiber material has been structured in at least two spatial directions.

WO 2012/025165 describes a core element for production of reinforced foams. The core element is produced by bonding a precut foam element to a fiber material on at least one side. This can be effected, for example, in a mold comprising the fiber material, into which a foamable polymer is then injected, which forms the foam in the course of foaming and becomes bonded to the fiber material. The core elements thus obtained can then be bonded to one another via the side to which the fiber material has been applied in order thus to form a reinforced foam. By the process described in WO 2012/025165, it is possible to produce reinforced foams in which the fiber material is embedded into the foam. However, a disadvantage in the process described is that continuous performance is not possible. Therefore, the process is extremely time-consuming and costly. Moreover, the areas to which the fiber material has been applied must be planar in order to enable bonding of the core elements to one another.

U.S. Pat. No. 5,866,051 discloses a continuous process for producing fiber-reinforced foams. In this process, a foamable polymer is extruded through a die and, at the same time, a fiber material (prepreg) is drawn in extrusion direction. In the process described in U.S. Pat. No. 5,866,051, the foamable polymer and the fiber material are bonded to one another in the die. According to U.S. Pat. No. 5,866,051, it is also possible to postpone bonding of the foamable polymer and the fiber material to one another until they are outside the die. However, the fiber material in that case is applied to the foam. In this embodiment, the fiber material thus cannot be embedded into the foam. When the fiber material and the foam are bonded to one another outside the die, moreover, the fiber material is not extruded through the same die as the foam. Therefore, complex roll systems are additionally required in order to apply the fiber material to the foam. U.S. Pat. No. 5,866,051 also discloses merely the use of planar fiber materials in the reinforced foam. Optimal reinforcement in three spatial directions is therefore not possible by the process described.

It is therefore an object of the present invention to provide a tool (W) and a process for producing fiber/foam composites which have the disadvantages of the apparatuses and processes as described in the prior art to a reduced degree, if at all.

This object is achieved by a tool (W) comprising a housing (1) having
- at least one first inlet opening (E1) and at least one second inlet opening (E2),
- at least one first outlet opening (A1), at least one second outlet opening (A2) and at least one third outlet opening (A3) and
- a first side (9) having a width (B),
- wherein
- the first outlet opening (A1), the second outlet opening (A2) and the third outlet opening (A3) are arranged on the first side (9) of the housing (1) and where
- the first outlet opening (A1) is connected to the first inlet opening (E1),
- wherein
- the second outlet opening (A2) and the third outlet opening (A3) are connected to one another by the second inlet opening (E2) via a multiway distributor (6) and
- the second outlet opening (A2) and the third outlet opening (A3) alternate with the first outlet opening (A1) at least over part of the width (B) of the first side (9).

The object underlying the present invention is also achieved by a process for producing a fiber/foam composite by extrusion through the tool (W) of the invention, comprising the following steps:
a) providing a fiber material (FM) and a foamable polymer (SP),
b) feeding the fiber material (FM) through the first inlet opening (E1) into the tool (W), c) feeding the foamable polymer (SP) through the second inlet opening (E2) into the tool (W), and d) extruding the fiber material (FM) through the first outlet opening (A1) of the tool (W) and extruding the foamable polymer (SP) through the second outlet opening (A2) and through the third outlet opening (A3) of the tool (W), with foaming of the foamable polymer (SP) to obtain a foam and bonding to the fiber material (FM) to obtain the fiber/foam composite.

A BRIEF DESCRIPTION OF THE FIGURES

Figure 1:
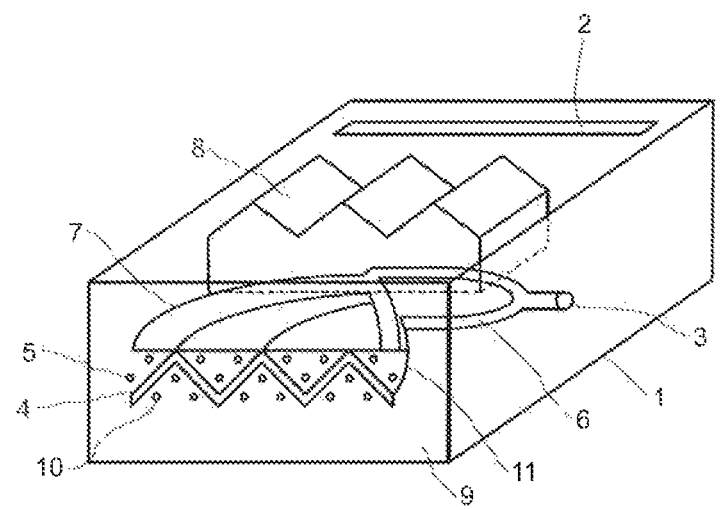
FIG. 1 shows, by way of example, a preferred inventive embodiment of the tool (W) that has a housing 1.
Figure 3:
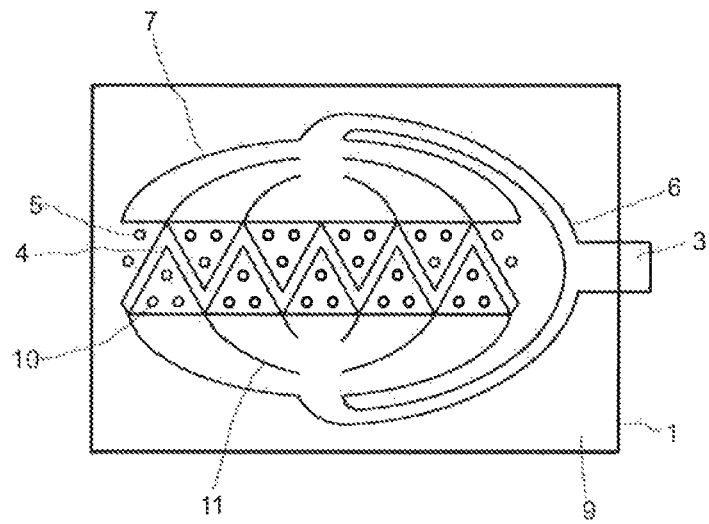

FIG. 3 shows a view of the first side 9 of the tool (W) according to FIG. 1 and the first slot distributor 7 behind the first side 9 and the second slot distributor 11, and also the multiway distributor 6.

Figure 4:
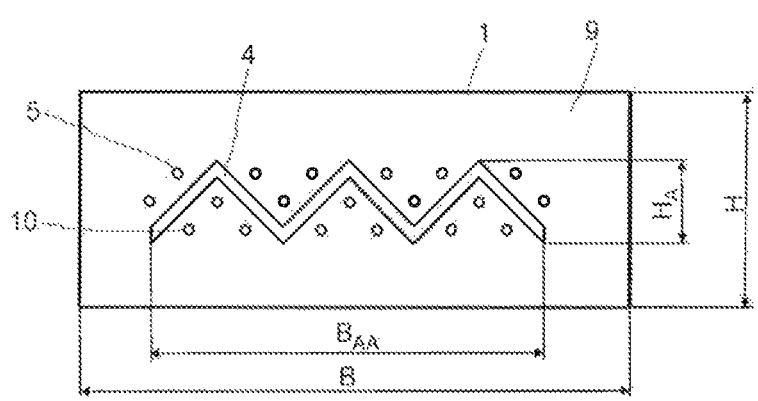

FIG. 4 shows a view of the first side 9 of one embodiment of the tool (W) of the invention, in order to illustrate the width (B) of the first side 9 and the height (H) of the first side 9, and also the width (BA1) of the first outlet opening (A1, 4) and the height (HA) of the first outlet opening (A1, 4).

FIGS. 5a to 5e shows various reinforced foams produced by the process of the invention.

Figure 6:
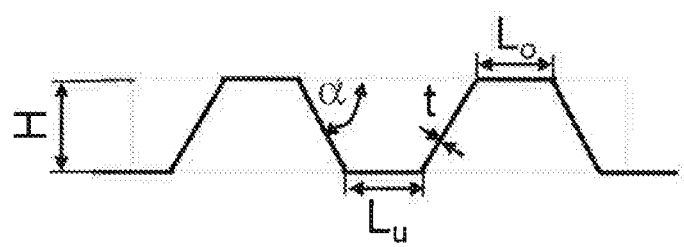

FIG. 6 shows a fiber/foam composite 14 produced in accordance with the invention.

The tool (W) of the invention and the process of the invention enable the production of fiber/foam composites in which the fiber material (FM) has been embedded into the foam. By means of the tool (W) of the invention, the fiber material (FM) can be extruded together with the foamable polymer (SP) out of the mold (W) in such a way that the fiber material (FM) can be embedded into the foam.

Since the foamable polymer (SP) used in the process of the present invention and the fiber material (FM) can be extruded through the same tool (W), complex guiding of the fiber material (FM) via complex roll systems can be avoided in the process of the invention.

Since, with the tool (W) of the invention and the process of the invention, contact between the foamable polymer (SP) or the foam and the fiber material (FM) is postponed until after they exit from the outlet openings, the foamable polymer (SP) can be kept under high pressure until it exits from the second outlet opening (A2) and from the third outlet opening (A3).

This is significant in a preferred embodiment of the present invention since, in this preferred embodiment, a blowing agent is dissolved in the foamable polymer (SP). The higher the pressure under which the foamable polymer (SP) is kept, the more blowing agent can be dissolved in the foamable polymer (SP). The more blowing agent is dissolved in the foamable polymer (SP), the more fluid the foamable polymer (SP) becomes, i.e. the lower its viscosity and the higher the flowability. In this way, moreover, blockage of the second and third outlet openings (A2, A3) and of the connection between the second inlet opening (E2) and the second outlet opening (A2) and between the second inlet opening (E2) and the third outlet opening (A3) is avoided. Since the pressure under which the foamable polymer (SP) is kept can be controlled accurately, it is possible to plan exactly how much blowing agent is dissolved in the foamable polymer (SP) and hence to accurately determine the extent to which the foamable polymer (SP) will foam in the extrusion through the second outlet opening (A2) and through the third outlet opening (A3) to obtain the foam. Moreover, the foamable polymer (SP) foams particularly uniformly as a result.

According to the invention, the second outlet opening (A2) and the third outlet opening (A3) are connected to the second inlet opening (E2) by a multiway distributor (6). The use of the multiway distributor (6) in order to distribute the foamable polymer (SP) fed in through the second inlet opening (E2) between the second outlet opening (A2) and the third outlet opening (A3) is particularly advantageous since the foamable polymer (SP) extruded through the second outlet opening (A2) is identical to the foamable polymer (SP) extruded through the third outlet opening (A3). The foamable polymer (SP) extruded through the second and third outlet openings (A2, A3) therefore shows identical foaming characteristics on either side of the fiber material (FM), such that much more uniform fiber/foam composites are obtained. In processes in which a foamable polymer (SP) that has not been fed in via the same second inlet opening (E2) is extruded through the second and third outlet openings (A2, A3), it is possible in principle that the foamable polymer (SP) which is extruded through one of the two outlet openings (A2, A3) will foam to a greater extent than that extruded through the other of the two outlet openings (A2, A3) and hence the fiber/foam composite will warp.

In the processes described in the prior art, the foamable polymer (SP) is provided in an extruder, for example. The extruder is connected to a die (a tool). Typically, the die (the tool) has an inlet opening to which the extruder is then directly connected, and this inlet opening is in turn connected to an outlet opening. In general, multiple inlet openings are used when there are multiple outlet openings in the die. In that case, the inlet openings are each connected via connecting pieces to the respective extruder. Suitable connecting pieces are flanges, for example. The connecting pieces are typically weak points at which leaks can occur. The use of the multiway distributor (6) in the tool (W) of the invention can keep the number of second inlet openings (E2) small compared to the number of second outlet openings (A2) and of third outlet openings (A3). This means that the number of points at which leaks can potentially form is also small, which makes the process of the present invention safer than the processes described in the prior art since toxic vapors, for example, can escape via leaks of this kind. Moreover, leaks reduce the pressure in the melt of the foamable polymer (SP), which is likewise considered to be disadvantageous.

The process of the present invention is also less expensive than the processes described in the prior art since the production of the fiber/foam composite can be conducted continuously. Moreover, the tool (W) of the invention and the process of the invention enable the production of fiber/foam composites in which the fiber material (FM) has two-dimensional structuring. Fiber/foam composites produced in accordance with the invention and having two-dimensional structuring of the fiber material (FM) have particularly good mechanical properties in all three spatial directions, especially very high shear rigidity.

There follows a detailed definition of the tool (W) of the invention and the process of the invention.

According to the invention, the tool (W) comprises a housing (1). The housing (1) may have any of the forms known to the person skilled in the art. The housing (1) may, for example, be an open housing or a closed housing. Preferably in accordance with the invention, the housing (1) is a closed housing.

A closed housing does not have any further openings aside from the first inlet opening (E1), the second inlet opening (E2), the first outlet opening (A1), the second outlet opening (A2) and the third outlet opening (A3).

An open housing may have further openings as well as the first inlet opening (E1), the second inlet opening (E2), the first outlet opening (A1), the second outlet opening (A2) and the third outlet opening (A3). For example, the underside of the housing may be open.

According to the invention, the housing (1) comprises a first side (9). Typically, the housing comprises at least one further side. "At least one further side" means either exactly one further side or two or more further sides. Preference is given in accordance with the invention to 2 or more further sides. For example, the housing (1) comprises 3 to 10 further sides.

It is also preferable in accordance with the invention that at least one of the further sides of the housing (1) directly adjoins the first side (9) of the housing (1).

The first side (9) of the housing (1) is typically planar and generally arranged perpendicularly to the extrusion direction of the tool (W).

The "extrusion direction of the tool (W)" is understood to mean the direction in which the fiber material (FM) and the foamable polymer (SP) are extruded in the process of the invention. Extrusion direction is also referred to in the context of the present invention as "z direction".

"Essentially perpendicularly" to extrusion direction in the context of the present invention means that the difference in the angle between extrusion direction and the first side (9) from 90° is not more than +/−45°, preferably not more than +/−25° and especially preferably not more than +/−5°.

According to the invention, the first side (9) has a width (B). In addition, the first side (9) typically has a height (H).

The width (B) is understood to mean the total width of the first side (9). The height (H) is understood to mean the total height of the first side (9).

In the context of the present invention, the height (H) of the first side (9) is preferably less than or equal to the width (B) of the first side (9). The width (B) of the first side (9) in the context of the present invention is also referred to as "y direction"; the height (H) of the first side (9) is also referred to as "x direction", based on a right-angled two-dimensional system of coordinates in the plane of the first side (9). The extrusion direction in z direction of the corresponding three-dimensional system of coordinates is arranged essentially perpendicularly to this two-dimensional system of coordinates. The remarks and preferences described above are correspondingly applicable to the expression "essentially perpendicularly".

According to the invention, at least one first outlet opening (A1), at least one second outlet opening (A2) and at least one third outlet opening (A3) are disposed on the first side (9) of the housing (1).

"At least one first outlet opening (A1)" in the context of the present invention means either exactly one first outlet opening (A1) or two or more first outlet openings (A1).

The number of first outlet openings (A1) in the tool (W) is typically dependent on the number of fiber materials (FM) provided in process step a) of the process of the invention. If, for example, exactly one fiber material (FM) is provided, preference is given to exactly one first outlet opening (A1). If, by contrast, two or more fiber materials (FM) are provided, preference is given to two or more first outlet openings (A1).

It is also possible that, in the process of the invention, two or more fiber materials (FM) are provided and the tool (W) comprises exactly one first outlet opening (A1). In that case, the total length of the first outlet opening (A1) typically corresponds at least to the sum total of the widths of the two or more fiber materials (FM).

The fiber material (FM) provided in the process of the invention typically has a length, a thickness and a width. In the context of the present invention, the length of the fiber material (FM) is understood to mean the extent of the fiber material (FM) in extrusion direction. The width is understood to mean the extent of the fiber material (FM) in the direction of the width (B) of the first side (9), where the width of the fiber material (FM) relates to the flat fiber material (FM), i.e., for example, without structuring having been introduced by means of a mold (8).

Preferably, the thickness of the fiber material (FM) is less than or equal to the width of the fiber material (FM). Based on a right-angled system of coordinates, according to the invention, the length of the fiber material (FM) is also referred to as z direction, the width is also referred to as y direction, and the thickness is also referred to as x direction.

Suitable first outlet openings (A1) are in principle all outlet openings known to those skilled in the art. Preference is given to a first outlet opening (A1) that enables the extrusion of the fiber material (FM) in the process of the invention. For example, the first outlet opening (A1) is slot-shaped, star-shaped or punctiform. Preferably, the first outlet opening (A1) is slot-shaped or punctiform.

Thus, it is preferable in accordance with the invention that the first outlet opening (A1) is slot-shaped, star-shaped or punctiform and/or the first side (9) comprises 1 to 50, more preferably 1 to 25, especially preferably 1 to 10, first outlet openings (A1).

If two or more first outlet openings (A1) are used, these may also have different shapes.

In general, the first outlet opening (A1) in the process of the invention is matched to the shape of the fiber material (FM) provided in process step a) of the process of the invention. If, for example, a flat fiber material (FM) is provided in the process of the invention, the first outlet opening (A1) is preferably slot-shaped. If the fiber material (FM) used is, for example, a fiber material (FM) having a round cross section, the first outlet opening (A1) is preferably punctiform.

A slot-shaped first outlet opening (A1) may, for example, be linear, but may also have curves and/or corners and may, for example, have a wavy and/or meandering shape.

If the first outlet opening (A1) has a wavy shape, for example, this means that there is at least one region (F) across the width (B) of the first side (9) in which the first outlet opening (A1) has a positive slope, followed by a region (O) having a length ($L_O$) having a slope of 0, followed by a region (N) having a negative slope, which is followed by a region (U) having a length ($L_U$) and a slope of 0. A sequence of this kind may be repeated. The sequence may repeat in a regular or irregular manner; this sequence preferably repeats in a regular manner.

"Regular" means that, for example, there is repetition of the length and slope of each region. "Irregular" means that, although there is repetition of regions, there is variation, for example, in length and slope.

It is also possible that, for example, the region (O) and/or the region (U) has a length ($L_O$) and/or ($L_U$) of zero centimeters.

If these two regions (O) and (U) have a length ($L_O$) and ($L_U$) of zero centimeters and the region (P) and the region (N) each have the same slope over the entire range, the first outlet opening (A1) has a zigzag shape, for example.

More preferably in accordance with the invention, the first outlet opening (A1) is slot-shaped, most preferably zigzag-shaped.

The first outlet opening (A1) may also be interrupted. In that case, the first outlet opening (A1) comprises two or more first outlet openings (A1). If the first outlet opening (A1) has the above-described regions, it may be interrupted either between the individual regions or within the individual regions.

The first outlet opening (A1) may be described, for example, by the following six values:

width ($B_{A1}$): the width ($B_{A1}$) indicates the width of the first outlet opening (A1) measured across the width (B) of the first side (9). The width ($B_{A1}$) may vary over a wide range. In one embodiment of the invention, it is in the range from 10 to 4000 cm, preferably in the range from 200 to 2500 cm and especially preferably in the range from 500 to 1300 cm.

height ($H_A$): the height ($H_A$) indicates the distance between the lowermost bottom edge of the first outlet opening (A1) and the uppermost top edge of the first outlet opening (A1). The terms "lower edge" and "upper edge" are based on the edges across the height (H) of the first side (9). In one embodiment of the invention, the height (HA) is in the range from 1 to 200 mm, preferably in the range from 5 to 150 mm and especially preferably in the range from 5 to 100 mm.

thickness (t): the thickness (t) indicates the distance between a lower edge and an upper edge of one of the above-described regions of the first outlet opening (A1). The thickness (t) may vary over the width ($B_{A1}$) of the first outlet opening (A1). Preferably, the thickness (t) of the first outlet opening (A1) is essentially constant. In the context of the present invention, "essentially constant" means that the thickness (t) varies across the width ($B_{A1}$) of the first outlet opening (A1) by a maximum of +/−0.1 mm, preferably by +/−0.05 mm and especially preferably by a maximum of +/−0.01 mm. In one embodiment of the invention, the thickness (t) of the first outlet opening (A1) is in the range from 0.05 to 10 mm, preferably in the range from 0.1 to 5 mm and especially preferably in the range from 0.1 to 2 mm. In one embodiment of the process of the invention, the thickness (t) of the first outlet opening (A1) is matched to the thickness of the fiber material (FM) used in the process.

lower length ($L_U$): the lower length ($L_U$) is the length of the above-described region (U) that has a slope of 0 in the case of a wave-shaped first outlet opening (A1), for example. The lower length ($L_U$) is measured across the width (B) of the first side (9). It is typically in the range from 0 to 100 mm, preferably in the range from 0 to 50 mm and especially preferably in the range from 0 to 20 mm.

upper length ($L_O$): the upper length ($L_O$) is the length of the above-described region (O) that has a slope of 0, in the case of a wave-shaped first outlet opening (A1), for example. The upper length ($L_O$) is measured across the width (B) of the first side (9). It is typically in the range from 0 to 100 mm, preferably in the range from 0 to 50 mm and especially preferably in the range from 0 to 20 mm.

angle ($\alpha$): the angle ($\alpha$) is defined as the angle between the tangent to the above-described region (O) with a slope of 0 and the above-described region (N) with the negative slope, in the case of a wave-shaped first outlet opening (A1), for example. The angle ($\alpha$) is typically in the range from 10 to 90°, preferably in the range from 40 to 90°.

The above-described values are shown by way of example in FIG. 6. FIG. 6 shows a fiber/foam composite 14 produced in accordance with the invention. This comprises a foam 13 and a fiber material (FM; 12). The first outlet opening (A1) of the tool (W) for production of this fiber/foam composite 14 has the same shape as the fiber material (FM; 12) of the fiber/foam composite 14. In FIG. 6, therefore, the above-described values for the first outlet opening (A1) are shown in the fiber material (FM; 12).

FIGS. 5a to 5e shows various reinforced foams produced by the process of the invention. The lines with the reference numerals 12 correspond to the fiber material (FM). For production of the fiber/foam composites 14, the fiber material (FM, 12) was extruded through a first outlet opening (A1) in the shape of the lines with the reference numeral 12. Accordingly, the lines with the reference numeral 12 in FIGS. 5a to 5e are examples of shapes of the first outlet opening (A1).

According to the invention, the first side (9) additionally comprises at least one second outlet opening (A2) and at least one third outlet opening (A3).

In the context of the present invention, "at least one second outlet opening (A2)" means either exactly one second outlet opening (A2) or two or more second outlet openings (A2). Preference is given in accordance with the invention to two or more second outlet openings (A2).

In the context of the present invention, "at least one third outlet opening (A3)" means either exactly one third outlet opening (A3) or two or more third outlet openings (A3). Preference is given to two or more third outlet openings (A3).

For example, the first side (9) may comprise 1 to 1000 second outlet openings (A2). Preferably, the first side (9) comprises 3 to 500 second outlet openings (A2) and, more preferably, the first side (9) comprises 5 to 100 second outlet openings (A2).

For example, the first side (9) comprises 1 to 1000 third outlet openings (A3). Preferably, the first side (9) comprises 3 to 500 third outlet openings (A3) and, especially preferably, the first side (9) comprises 5 to 100 third outlet openings (A3).

For example, the first side (9) thus has 1 to 1000 second outlet openings (A2) and/or 1 to 1000 third outlet openings (A3).

Suitable second outlet openings (A2) of the tool (W) are in principle all outlet openings known to those skilled in the art. Preference is given to second outlet openings (A2) that enable extrusion of the foamable polymer (SP) in the process of the invention. The second outlet opening (A2) may in principle have all known shapes. The second outlet opening (A2) may, for example, be slot-shaped, star-shaped, ellipsoidal, polygonal or punctiform. Preferably, the second outlet opening (A2) is punctiform.

The size of the second outlet opening (A2) may vary over a wide range. Preferably, the second outlet opening (A2) has a diameter in the range from 0.1 to 5 mm, more preferably a diameter in the range from 0.5 to 3 mm and especially preferably a diameter in the range from 1.5 to 2 mm.

When the second outlet opening (A2) has a cross section that differs from the round shape, the diameter is determined as the average of the greatest and smallest diameters of the second outlet opening (A2). Methods for this purpose are known to those skilled in the art.

In respect of the third outlet opening (A3), the remarks and preferences as described above for the second outlet opening (A2) are correspondingly applicable.

Preferably, the second outlet opening (A2) and/or the third outlet opening (A3) of the tool (W) of the invention is therefore slot-shaped, star-shaped, ellipsoidal, polygonal or punctiform.

According to the invention, the second outlet opening (A2) and the third outlet opening (A3) alternate with the first outlet opening (A1) over at least part of the width (B) of the first side (9). This is understood to mean that, across the width (B) of the first side (9), for example, there is an alternating arrangement of a second outlet opening (A2), then a first outlet opening (A1) and then a third outlet opening (A3). The sequence of the outlet openings thus follows, for example, the A2, A1, A3 pattern. If the tool (W) comprises two or more second outlet openings (A2) and/or two or more third outlet openings (A3), the pattern may follow, for example, the A2, A1, A3, A1, A2, A1, A3, A1, A2 sequence.

In other words, the second outlet opening (A2) and the third outlet opening (A3) are separated from one another by the first outlet opening (A1) at least over part of the width (B) of the first side (9).

If the tool (W) comprises two or more second outlet openings (A2) and/or two or more third outlet openings (A3), it is also possible for two or more second outlet openings (A2) to be separated by the first outlet opening (A1) from two or more third outlet openings (A3).

It is thus also possible in accordance with the invention that the second outlet opening (A2) and the third outlet opening (A3) alternate with the first outlet opening (A1) only over part of the width (B) of the first side (9).

In a further embodiment of the invention, the second outlet opening (A2) and the third outlet opening (A3) additionally alternate with the first outlet opening (A1) over the height (H) of the first side (9).

The second outlet opening (A2) and the third outlet opening (A3) may be disposed over the entire width (B) and the entire height (H) of the first side (9).

Preferably, the second outlet opening (A2) and the third outlet opening (A3) are disposed in a region between the lowermost lower edge of the first outlet opening (A1) and the uppermost upper edge of the first outlet opening (A1).

Further preferably, the second outlet opening (A2) and/or the third outlet opening (A3) are disposed over the entire width ($B_{A1}$) of the first outlet opening (A1).

In a further preferred embodiment, the second outlet opening (A2) and/or the third outlet opening (A3) are disposed only over part of the width ($B_{A1}$) of the first outlet opening (A1).

In a further preferred embodiment, the second outlet opening (A2) and/or the third outlet opening (A3) are disposed over a region across the width (B) of the first side (9), said region being larger than the width ($B_{A1}$) of the first outlet opening (A1).

Preferably, the first outlet opening (A1) has a zigzag profile and the second outlet opening (A2) is disposed above the upper edge of the first outlet opening (A1) and the third outlet opening (A3) is disposed below the lower edge of the first outlet opening (A1).

In an especially preferred embodiment of the tool (W) of the invention, there is no contact between the second outlet opening (A2) and the first outlet opening (A1) and between the third outlet opening (A3) and the first outlet opening (A1) within the tool (W). In the process of the invention, this means that the fiber material (FM) which is extruded through the first outlet opening (A1) in process step d) does not come into contact in the tool (W) with the foamable polymer (SP) which is extruded through the second outlet opening (A2) and the third outlet opening (A3). The foamable polymer (SP) and the fiber material (FM) thus do not come into contact with one another until extrusion from the tool (W).

According to the invention, the housing (1) of the tool (W) also comprises at least one first inlet opening (E1) and at least one second inlet opening (E2).

In the context of the present invention, "at least one first inlet opening (E1)" means either exactly one first inlet opening (E1) or two or more first inlet openings (E1).

The number of first inlet openings (E1) in the tool (W) depends, for example, on the number of fiber materials (FM) provided in process step a) of the process of the invention. If, for example, exactly one fiber material (FM) is provided, preference is given to exactly one first inlet opening (E1). If, by contrast, two or more fiber materials (FM) are provided, the first inlet opening (E1) preferably comprises two or more first inlet openings (E1).

It is also possible that two or more fiber materials (FM) are provided and the tool (W) comprises exactly one first inlet opening (E1). In that case, the width ($B_{E1}$) of the first inlet opening (E1) typically corresponds at least to the sum total of the widths of the two or more fiber materials (FM).

The first inlet opening (E1) has a width ($B_{E1}$) and a thickness ($D_{E1}$). The width ($B_{E1}$) of the first inlet opening (E1) is preferably at right angles to extrusion direction. By definition, thickness ($D_{E1}$) of the first inlet opening (E1) is always less than or equal to the width ($B_{E1}$) of the first inlet opening (E1). The width ($B_{E1}$) is typically perpendicular to the thickness ($D_{E1}$). With regard to a right-angled two-dimensional system of coordinates, the width ($B_{E1}$) is always referred to as the y direction and the thickness ($D_{E1}$) as the x direction. The thickness ($D_{E1}$) may be either perpendicular to extrusion direction or parallel to extrusion direction, depending on where the first inlet opening (E1) is disposed in the housing (1).

Suitable first inlet openings (E1) are in principle all inlet openings known to those skilled in the art. Preferably, the shape of the first inlet opening (E1) is such that the fiber material (FM) in the process of the invention can be supplied to the tool (W) through the first inlet opening (E1) of the tool (W). Especially preferably, the first inlet opening (E1) is punctiform or slot-shaped.

In general, the first inlet opening (E1) in the process of the invention is matched to the shape of the fiber material (FM) provided in process step a) of the process of the invention. If, in the process of the invention, for example, a flat fiber material (FM) is provided, the first inlet opening (A1) is preferably slot-shaped. If the fiber material (FM) used is, for example, a fiber material (FM) having a round cross section, the first inlet opening (A1) is preferably punctiform.

Moreover, the first inlet opening (E1) may comprise devices that facilitate the feeding of the fiber material (FM) in the process of the invention. For example, the first inlet opening (E1) may comprise rolls over which the fiber material (FM) can be guided within the tool (W).

The first inlet opening (E1) may be disposed on any side of the housing (1). Typically, the first inlet opening (E1) is disposed on any of the further sides that may be present. Especially preferably, the first inlet opening (E1) is disposed on the housing (1) such that the fiber material (FM) which is supplied to the tool (W) through the first inlet opening (E1) in the process of the invention and is extruded through the first outlet opening (A1), is not folded and/or twisted in terms of its width except by any mold (8) present between the first inlet opening (E1) and the first outlet opening (A1).

The distance between the first inlet opening (E1) and the first outlet opening (A1) may be as desired.

According to the invention, the first outlet opening (A1) is connected to the first inlet opening (E1). In the context of the present invention, "connected" means that the fiber material (FM) in the process of the present invention can be fed to the tool (W) through the first inlet opening (E1) and can be extruded from the tool (W) through the first outlet opening (A1).

In other words, "connected" means that the first inlet opening (E1) is connected to the second outlet opening (A1) at least via the fiber material (FM) when it is supplied to the tool (W) via the first inlet opening (E1). It is thus not necessary in accordance with the invention for there to be devices between the first inlet opening (E1) and the first outlet opening (A1) that connect the first inlet opening (E1) to the first outlet opening (A1).

In one embodiment of the present invention, there are devices between the first inlet opening (E1) and the first outlet opening (A1) that connect the first outlet opening (A1) to the first inlet opening (E1). For example, the first inlet opening (E1) and the first outlet opening (A1) may be connected to one another by at least one conduit, for example a channel conduit, and/or at least one conveyor belt.

Preferably disposed between the first inlet opening (E1) and the first outlet opening (A1) are rolls via which the fiber material (FM) can be conveyed.

There is preferably at least one mold (8) in the connection between the first inlet opening (E1) and the first outlet opening (A1).

In the context of the present invention, "at least one mold (8)" means either exactly one mold (8) or two or more molds (8). When two or more molds (8) are used in the tool (W) of the invention, the molds (8) may be arranged alongside one another or in succession. The terms "alongside one another" and "in succession" indicate the arrangement of the molds (8) viewed in extrusion direction. Preferably, two or more molds (8) are arranged in succession.

The mold (8) serves to shape the fiber material (FM) in the process of the invention. Suitable molds (8) for this purpose are known as such to those skilled in the art. Preference is given to molds (8) that continuously form the fiber material (FM), such that the process of the present invention can be conducted continuously.

The mold (8) may, for example, have slots through which the fiber material (FM) can be guided and hence converted to the desired shape. In addition, the fiber material (FM) may, for example, be heated upstream of the mold (8) or within the mold (8) in order to shape the fiber material (FM).

In one embodiment of the present invention, the mold (8) can thus be heated. The fiber material (FM) may also be formed in the mold (8), for example by pressure.

The mold (8) is generally disposed essentially perpendicularly to extrusion direction. With regard to "essentially perpendicularly", the details and preferences described above are applicable.

Preferably, the mold (8) is disposed essentially perpendicularly to the connection between the first inlet opening (E1) and the first outlet opening (A1).

In addition, it is possible that the mold (8) tapers conically, for example, in extrusion direction.

It is preferable that the mold (8) has three-dimensional structuring. More preferably, the three-dimensional structuring of the mold (8) has the same shape as the first outlet opening (A1).

It is especially preferable that the mold (8) of the tool (W) has three-dimensional structuring in the shape of the first outlet openings (A1) and/or is disposed essentially perpendicularly to the connection between the first inlet opening (E1) and the first outlet opening (A1).

Three-dimensional structuring means that the mold (8) has, on at least one side that runs essentially parallel to extrusion direction, structuring preferably formed essentially perpendicularly to extrusion direction.

"Essentially parallel" means that the angle between the side having the three-dimensional structuring and extrusion direction differs from the parallel direction by a maximum of $+/-45°$, preferably by a maximum of $+/-30°$ and more preferably by a maximum of $+/-20°$.

In respect of the shape of the three-dimensional structuring, the details and preferences described above for the shape of the first outlet opening (A1) are applicable.

"At least one second inlet opening (E2)" in the context of the present invention means either exactly one second inlet opening (E2) or two or more second inlet openings (E2).

Suitable second inlet openings (E2) are in principle all inlet openings known to those skilled in the art. Preference is given to second inlet openings (E2) that are suitable for feeding the foamable polymer (SP) to the tool (W) through the second inlet opening (E2) in the process of the invention.

The second inlet opening (E2) may be disposed on any side of the housing (1). Preferably, the second inlet opening is disposed on one of the further sides, and the second inlet opening (E2) is especially preferably disposed on one of the further sides that directly adjoins the first side (9). Most preferably, the second inlet opening (E2) is disposed on one of the further sides that directly adjoins the first side (9) in x direction of the first side (9). In addition, it is preferable that the second inlet opening (E2) is disposed on one of the further sides on which the first inlet opening (E1) is not disposed.

According to the invention, the second inlet opening (E2) is connected to the second outlet opening (A2) and the third outlet opening (A3) by a multiway distributor (6).

Multiway distributors (6) as such are known to those skilled in the art. Typically, multiway distributors (6) comprise at least one inlet opening and at least two outlet openings. Preference is given in accordance with the invention to multiway distributors (9) having 1 to 10 inlet openings and 2 to 20 outlet openings. Particular preference is given in accordance with the invention to multiway distributors having 1 to 5 inlet openings and 2 to 10 outlet openings, and multiway distributors (6) having 1 to 3 inlet openings and 2 to 5 outlet openings are especially preferred.

In one embodiment of the present invention, the second outlet opening (A2) is connected to the second inlet opening (E2) by a first outlet opening of the multiway distributor (6) and the inlet opening of the multiway distributor (6), and the third outlet opening (A3) is connected to the second inlet opening (E2) by a second outlet opening of the multiway distributor (6) and the inlet opening of the multiway distributor (6).

The multiway distributor (6) of the invention may comprise further internals known to those skilled in the art. These internals may be static or dynamic. Static internals do not have any moving parts; dynamic internals have moving parts. Examples of dynamic internals are valves.

In a preferred embodiment of the tool (W) of the invention, the second outlet opening (A2) is connected to the multiway distributor (6) via a first slot distributor (7). It is further preferable that the third outlet opening (A3) is connected to the multiway distributor (6) via a second slot distributor (11).

In one embodiment of the tool (W) of the invention, the second outlet opening (A2) is thus connected to the multiway distributor (6) via a first slot distributor (7) and/or the third outlet opening (A3) is connected to the multiway distributor (6) via a second slot distributor (11).

According to the invention, "a first slot distributor (7)" is understood to mean either exactly one first slot distributor (7) or two or more first slot distributors (7). According to the invention, "a second slot distributor (11)" is understood to mean either exactly one second slot distributor (11) or two or more second slot distributors (11).

In the context of the present invention, it is especially preferable that the second outlet opening (A2) is connected to the first outlet opening of the multiway distributor (6) via the first slot distributor (7) and that the third outlet opening (A3) is connected to the second outlet opening of the multiway distributor (6) via the second slot distributor (11).

Slot distributors as such are known to those skilled in the art. Preferably in accordance with the invention, the first slot distributor (7) and the second slot distributor (11) are each independently selected from the group consisting of coathanger distributors, fishtail distributors and T distributors. Particularly preferred first slot distributors (7) and second slot distributors (11) are coathanger distributors.

What is advantageous about the use of a first slot distributor (7) and/or a second slot distributor (11) is that the specific guiding of the channels in the first slot distributor (7) and/or in the second slot distributor (11) means that the foamable polymer (SP) can be extruded from the second and/or third outlet opening (A2, A3) in the process of the invention with equal pressure across the entire width of the first and/or second slot distributor (7, 11). The foamable polymer (SP) therefore foams uniformly on exit from the second and/or third outlet opening (A2, A3), and a particularly uniform foam is obtained. A uniform foam has, for example, a homogeneous distribution of pore size and/or a uniform thickness.

FIG. 1 shows, by way of example, a preferred inventive embodiment of the tool (W) that has a housing 1. The housing 1 has a first side 9. On this first side 9 is disposed a zigzag-shaped first outlet opening (A1, 4), as are multiple second outlet openings (A2, 5) and multiple third outlet openings (A3, 10). The second outlet openings (A2, 5) and the third outlet openings (A3, 10) alternate across the entire width ($B_{A1}$) of the first outlet opening (A1, 4) with the first outlet opening (A1, 4). The second outlet openings (A2, 5) are connected to the multiway distributor 6 via the first slot distributor 7 and the third outlet openings (A3, 10) are connected to the multiway distributor 6 via the second slot distributor 11. The second outlet openings (A2, 5) and the third outlet openings (A3, 10) are connected to the second inlet opening (E2, 3) present in the housing 1 via the multiway distributor 6. The housing 1 also has a first inlet opening (E1, 2). Between the first inlet opening (E1, 2) and the first outlet opening (A1, 4) there is a mold 8. One side thereof has the same zigzag shape as the first outlet opening (A1, 4).

Figure 2:
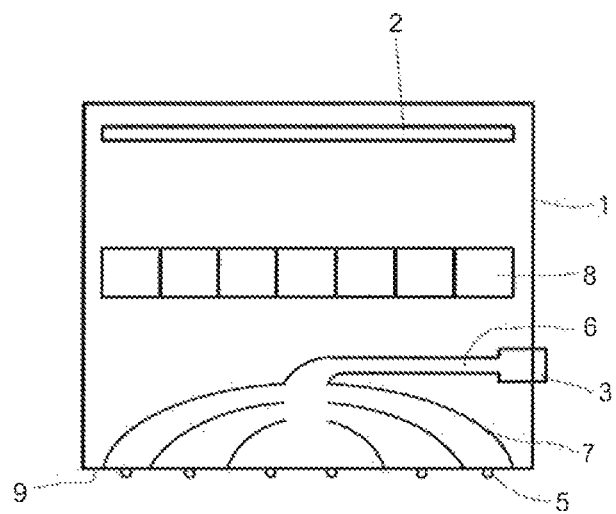
FIG. 2 shows the top view of the tool (W) shown in FIG. 1.

FIG. 2 shows the top view of the tool (W) shown in FIG. 1. This shows how the first slot distributor 7 connects the multiway distributor 6 to the second outlet openings (A2, 5).

FIG. 3 shows a view of the first side 9 of the tool (W) according to FIG. 1 and the first slot distributor 7 behind the first side 9 and the second slot distributor 11, and also the multiway distributor 6. It is shown how the second inlet opening (E2, 3) is connected via one inlet opening and the two outlet openings of the multiway distributor 6 to the first slot distributor (7) and the second slot distributor 11 and to the second outlet openings (A2, 5) and the third outlet openings (A3, 10). It will be apparent that the first slot distributor 7 shown in FIG. 3 and the second slot distributor 11, and also the multiway distributor 6, are arranged behind the first side 9 in spatial terms.

FIG. 4 shows a view of the first side 9 of one embodiment of the tool (W) of the invention, in order to illustrate the width (B) of the first side 9 and the height (H) of the first side 9, and also the width (BA of the first outlet opening (A1, 4) and the height (HA) of the first outlet opening (A1, 4). As is also the case in FIGS. 1 to 3, the first outlet opening (A1, 4) is arranged in a zigzag shape on the first side 9.

The present invention further provides a process for producing a fiber/foam composite using the above-described tool (W).

The present invention thus provides a process for producing a fiber/foam composite by extrusion through the tool (W) of the invention, comprising the following steps:
   a) providing a fiber material (FM) and a foamable polymer (SP),
   b) feeding the fiber material (FM) through the first inlet opening (E1) into the tool (W),
   c) feeding the foamable polymer (SP) through the second inlet opening (E2) into the tool (W), and
   d) extruding the fiber material (FM) through the first outlet opening (A1) of the tool (W) and extruding the foamable polymer (SP) through the second outlet opening (A2) and through the third outlet opening (A3) of the tool (W), with foaming of the foamable polymer (SP) to obtain a foam and bonding to the fiber material (FM) to obtain the fiber/foam composite.

The process of the invention is defined in detail hereinafter.

In the process of the invention, a fiber/foam composite is produced by extrusion through the tool (W) of the invention. In respect of the tool (W) used in the process of the invention, the above-described details and preferences are applicable.

The process is preferably conducted continuously.

In process step a), a fiber material (FM) and a foamable polymer (SP) are provided.

In the context of the present invention, "a fiber material (FM)" means either exactly one fiber material or two or more fiber materials. In the context of the present invention, "a foamable polymer (SP)" means either exactly one foamable polymer or a mixture of two or more foamable polymers.

Suitable fiber materials (FM) are in principle all fiber materials known to those skilled in the art. For example, the fiber material (FM) is selected from the group consisting of inorganic mineral fibers, organic fibers, natural polymers, natural organic fibers of vegetable or animal origin, carbon fibers and mixtures thereof.

Suitable inorganic mineral fibers are known to those skilled in the art. Preference is given to inorganic mineral fibers selected from the group consisting of glass fibers, basalt fibers, metal fibers, ceramic fibers and nanotube fibers.

Suitable organic fibers are likewise known to those skilled in the art. Preference is given to organic fibers selected from the group consisting of polycondensation fibers and polyaddition fibers.

Suitable natural polymers are known to those skilled in the art. Preference is given to natural polymers selected from the group consisting of cellulose-based fibers, rubber fibers, starch-based fibers and glucose-based fibers.

Preferably, the fiber material (FM) is therefore selected from the group consisting of glass fibers, basalt fibers, metal fibers, ceramic fibers, nanotube fibers, polycondensation fibers, polyaddition fibers, cellulose-based fibers, rubber fibers, starch-based fibers, glucose-based fibers and mixtures thereof.

The fiber material (FM) may be in all forms known to those skilled in the art. Preferably, the fiber material (FM) is in the form of a weave, scrim, braid, nonwoven, organosheet, card sliver and/or roving.

The fiber material (FM) may comprise a size. In addition, it is possible that the fiber material (FM) comprises a matrix material, a binder, thermoplastic fibers, powders and/or particles.

It is thus preferable in the process of the invention that
i) in process step a) a fiber material (FM) selected from the group consisting of inorganic mineral fibers, organic fibers, natural polymers, natural organic fibers of vegetable or animal origin, carbon fibers and mixtures thereof is provided, preferably selected from the group consisting of glass fibers, basalt fibers, metal fibers, ceramic fibers, nanotube fibers, polycondensation fibers, polyaddition fibers, cellulose-based fibers, rubber fibers, starch-based fibers, glucose-based fibers and mixtures thereof, and/or
ii) in process step a) the fiber material (FM) is in the form of a weave, scrim, braid, nonwoven, organosheet, card sliver and/or roving and/or
iii) in process step a) a fiber material (FM) comprising a size is provided and/or
iv) in process step a) a fiber material (FM) comprising a matrix material, a binder, thermoplastic fibers, powder and/or particles is provided.

The fiber material (FM) may be provided in process step a) by all methods known to those skilled in the art. Preferably, the fiber material (FM) is provided on rolls.

A suitable foamable polymer (SP) is in principle any foamable polymer known to those skilled in the art.

Preferably in accordance with the invention, the foamable polymer (SP) provided in process step a) is a thermoplastic polymer, preferably a thermoplastic polymer selected from the group consisting of thermoplastic elastomers, thermoplastic elastomers having copolymer structure, polyether amides, polyether esters, polyurethanes, styrene polymers, polyacrylates, polycarbonates, polyesters, polyethers, polyamides, polyether sulfones, polyether ketones, polyimides, polyvinyl chlorides, polyolefins, polyacrylonitriles, polyether sulfides, copolymers thereof and mixtures thereof.

These polymers are known as such to those skilled in the art.

The foamable polymer (SP) may be provided in process step a) by all methods known to those skilled in the art. Preferably, the foamable polymer (SP) is melted in an extruder and a blowing agent is dissolved in the foamable polymer (SP).

Suitable blowing agents are in principle all blowing agents known to those skilled in the art. The blowing agent is preferably selected from the group consisting of pentane, water, nitrogen and carbon dioxide.

Preferably, in the range from 0.2% to 20% by weight of the blowing agent is dissolved in the foamable polymer (SP), based on the total weight of the foamable polymer (SP).

Preferably, in the process of the invention therefore, 0.2% to 20% by weight of a blowing agent is dissolved in the foamable polymer (SP) provided in process step a), based on the total weight of the foamable polymer (SP).

In a preferred embodiment, the blowing agent is dissolved in the foamable polymer (SP) at elevated pressure. Preferably, the pressure is then maintained until exit from the tool (W) of the invention. This avoids premature outgassing of a portion of the blowing agent out of the foamable polymer (SP).

In process step b), the fiber material (FM) is fed to the tool (W) through the first inlet opening (E1). The feeding can be effected by all methods known to those skilled in the art. For example, the fiber material (FM) can be guided over rolls or via a conveyor belt in order to feed it to the tool (W) through the first inlet opening (E1).

Typically, the fiber material (FM) is guided through the first inlet opening (E1) in the tool (W) in such a way that it is not folded or twisted in terms of its width, except by any mold (8) present in the tool (W).

In one embodiment of the present process, the fiber material (FM) is guided through any mold (8) present in the tool (W). This two-dimensionally deforms the fiber material (FM), for example by the action of heat and/or pressure.

In process step c), the foamable polymer (SP) is fed to the tool (W) through the second inlet opening (E2). It will be apparent that the foamable polymer (SP) is fed to the tool (W) in step c) preferably in the form in which it is provided in step a), i.e. preferably in molten form and together with any blowing agent dissolved in the foamable polymer (SP).

On feeding through the second inlet opening (E2), the foamable polymer (SP) is distributed by means of the multiway distributor (6) of the invention uniformly between the second outlet opening (A2) and the third outlet opening (A3).

In process step d), the fiber material (FM) is extruded through the first outlet opening (A1) of the tool (W) and the foamable polymer (SP) is extruded through the second outlet opening (A2) and through the third outlet opening (A3) of the tool (W).

On extrusion of the foamable polymer (SP) through the second outlet opening (A2) and through the third outlet opening (A3) of the tool (W), the foamable polymer (SP) foams up to obtain a foam.

When the foamable polymer (SP) is extruded through two or more second outlet openings (A2) and/or two or more third outlet openings (A3), the foam strands that are preferably formed on extrusion are bonded to one another. More preferably, these strands of the foam are bonded seamlessly to one another. It is particularly preferable here that the bonding sites are microscopically small, i.e. are not apparent to the naked eye.

When the foamable polymer (SP) foams up, its volume increases. As a result, it comes into contact with the fiber material (FM) and can bond thereto. The connection between the foam formed and the fiber material (FM) can arise, for example, in that the foam and the fiber material (FM) stick to one another. It is likewise possible that the foam and the fiber material (FM) fuse to one another. It is also possible that the foam is merely mechanically fixed to the fiber material (FM), for example in that the foam penetrates into gaps in the fiber material (FM).

Figure 5A:
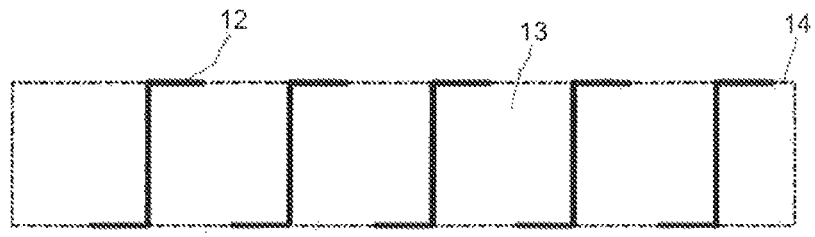
Figure 5B:
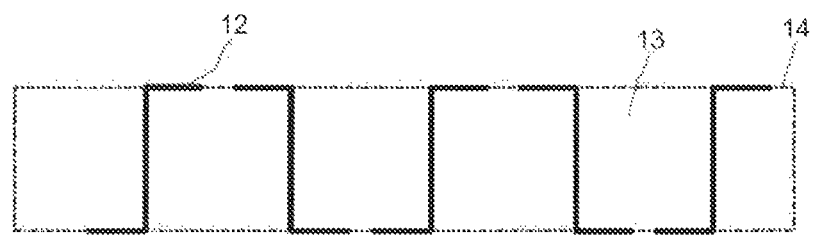
Figure 5C:
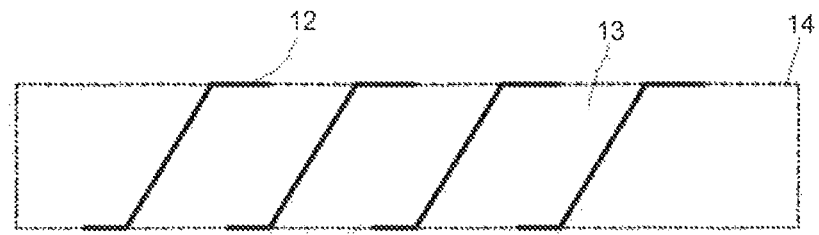
Figure 5D:
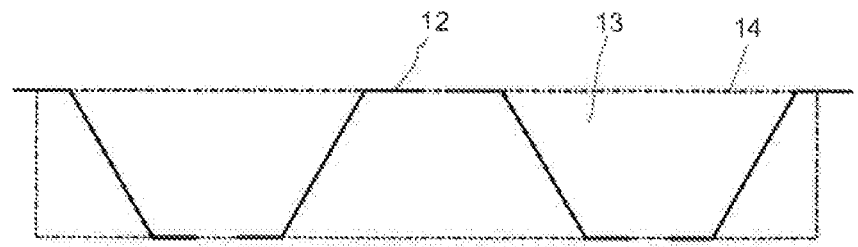
Figure 5E:
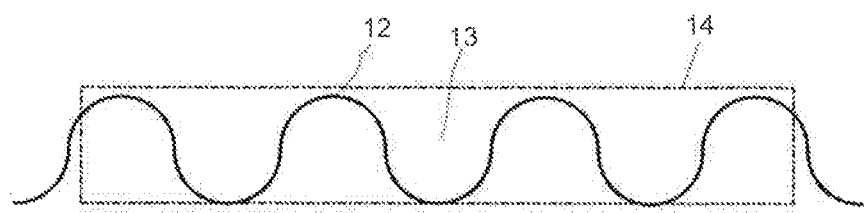

The bonding of the foam to the fiber material (FM) gives the fiber/foam composite. Examples of fiber/foam composites of this kind are shown in FIGS. 5a to 5e. This shows various two-dimensional structures for the fiber material (FM, 12). In FIGS. 5a, 5b, 5c and 5d, two or more fiber materials (FM, 12) were used. In FIG. 5e, exactly one fiber material (FM, 12) was used.

After they have been produced, the fiber/foam composites of the invention can be processed further. For example, multiple fiber/foam composites can be fused or bonded to one another. Preferably, multiple fiber/foam composites are fused to one another.

This can be effected by methods known to those skilled in the art.

The bonding or fusion of multiple fiber/foam composites additionally increases the mechanical stability of the fiber/foam composites produced in accordance with the invention.

The mutually bonded or fused fiber/foam composites may subsequently be cut up, for example.

In addition, it is possible that the fiber/foam composite is infiltrated with resin in a further process step. Methods for this purpose are known to those skilled in the art and are described, for example, in WO 03/024705.

It is of course possible to further process the fiber/foam composites produced in accordance with the invention in multiple steps; for example, it is first possible to infiltrate the fiber/foam composite with resin and then to fuse or bond multiple fiber/foam composites that have been infiltrated with resin in this way to one another.

Preferably, the fiber/foam composite obtained in process step d) of the process of the invention is infiltrated with resin in a further process step and/or the fiber/foam composite obtained has a proportion by volume of fibers in the range from 0.1% to 20% by volume, based on the total volume of the fiber/foam composite.

The present invention also provides for the use of the tool (W) of the invention for production of a fiber/foam composite by extrusion.

LIST OF REFERENCE NUMERALS 1 housing
2 first inlet opening (E1)
3 second inlet opening (E2)
4 first outlet opening (A1)
5 second outlet opening (A2)
6 3-way distributor
7 first slot distributor
8 mold
9 first side
10 third outlet opening (A3)
11 second slot distributor
12 fiber material (FM)
13 foam
14 fiber/foam composite
H height of the first side (9)
B width of the first side (9)
$B_{A1}$ width of the first outlet opening (A1)
$H_A$ height of the first outlet opening (A1)
$L_U$ lower length
$L_O$ upper length
t thickness of the first outlet opening (A1)
α angle

The invention claimed is:

1. A tool (W) for production of a fiber/foam composite in which a fiber material is embedded into the fiber/foam composite comprising a housing (1) having
at least one first inlet opening (E1) and at least one second inlet opening (E2),
one or more first outlet openings (A1), at least one second outlet opening (A2) and at least one third outlet opening (A3) and
a first side (9) having a width (B),
where
the first outlet opening (A1), the second outlet opening (A2) and the third outlet opening (A3) are arranged on the first side (9) of the housing (1) and where
the first outlet opening (A1) is connected to the first inlet opening (E1),
wherein
the second outlet opening (A2) and the third outlet opening (A3) are connected to one another by the second inlet opening (E2) via a multiway distributor (6) and
the second outlet opening (A2) and the third outlet opening (A3) alternate with the first outlet opening (A1) at least over part of the width (B) of the first side (9),
wherein there is at least one mold (8) in the connection between the first inlet opening (E1) and the first outlet opening (A1),
wherein the first outlet opening (A1) is configured to extrude the fiber material,
and wherein the first outlet opening (A1) runs in a zigzag and the second outlet opening (A2) is disposed above an upper edge of the first outlet opening (A1) and the third outlet opening (A3) is disposed below a lower edge of the first outlet opening (A1).

2. The tool (W) according to claim 1, wherein the second outlet opening (A2) is connected to the multiway distributor (6) via a first slot distributor (7) and/or the third outlet opening (A3) is connected to the multiway distributor (6) via a second slot distributor (11).

3. The tool (W) according to claim 1, wherein the mold (8) has three-dimensional structuring in the form of one or more first outlet openings (A1) and/or is arranged essentially perpendicularly to the connection between the first inlet opening (E1) and the first outlet opening (A1).

4. The tool (W) according to claim 1, wherein the first side (9) has 1 to 1000 second outlet openings (A2) and/or 1 to 1000 third outlet openings (A3).

5. The tool (W) according to claim 1, wherein the second outlet opening (A2) and/or the third outlet opening (A3) is slot-shaped, star-shaped, ellipsoidal, polygonal or punctiform.

6. The tool (W) according to claim 1, wherein the first outlet opening (A1) is slot-shaped, star-shaped or punctiform and/or the first side (9) comprises 1 to 50 first outlet openings (A1).

7. A process for producing a fiber/foam composite by extrusion through the tool (W) according to claim 1, comprising the following steps:
a) providing a fiber material (FM) and a foamable polymer (SP),
b) feeding the fiber material (FM) through the first inlet opening (E1) into the tool (W),
c) feeding the foamable polymer (SP) through the second inlet opening (E2) into the tool (W), and
d) extruding the fiber material (FM) through the first outlet opening (A1) of the tool (W) and extruding the foamable polymer (SP) through the second outlet opening (A2) and through the third outlet opening (A3) of the tool (W), with foaming of the foamable polymer (SP) to obtain a foam and bonding to the fiber material (FM) to obtain the fiber/foam composite, wherein tool (W) comprises a housing (1) having
at least one first inlet opening (E1) and at least one second inlet opening (E2),
one or more first outlet openings (A1), at least one second outlet opening (A2) and at least one third outlet opening (A3) and
a first side (9) having a width (B),
where
the first outlet opening (A1), the second outlet opening (A2) and the third outlet opening (A3) are arranged on the first side (9) of the housing (1) and where
the first outlet opening (A1) is connected to the first inlet opening (E1),
wherein
the second outlet opening (A2) and the third outlet opening (A3) are connected to one another by the second inlet opening (E2) via a multiway distributor (6) and
the second outlet opening (A2) and the third outlet opening (A3) alternate with the first outlet opening (A1) at least over part of the width (B) of the first side (9),
wherein there is at least one mold (8) in the connection between the first inlet opening (E1) and the first outlet opening (A1), and
wherein the first outlet opening (A1) is configured to extrude the fiber material,
and wherein the first outlet opening (A1) runs in a zigzag and the second outlet opening (A2) is disposed above an upper edge of the first outlet opening (A1) and the third outlet opening (A3) is disposed below a lower edge of the first outlet opening (A1).

8. The process according to claim 7, wherein
i) in process step a) a fiber material (FM) selected from the group consisting of inorganic mineral fibers, organic fibers, natural polymers, natural organic fibers of vegetable or animal origin, carbon fibers and mixtures thereof is provided, preferably selected from the group consisting of glass fibers, basalt fibers, metal fibers, ceramic fibers, nanotube fibers, polycondensation fibers, polyaddition fibers, cellulose-based fibers, rubber fibers, starch-based fibers, glucose-based fibers and mixtures thereof, and/or
ii) in process step a) the fiber material (FM) is in the form of a weave, scrim, braid, nonwoven, organosheet, card sliver and/or roving and/or
iii) in process step a) a fiber material (FM) comprising a size is provided and/or
iv) in process step a) a fiber material (FM) comprising a matrix material, a binder, thermoplastic fibers, powder and/or particles is provided.

9. The process according to 10, wherein in process step a) the foamable polymer (SP) provided is a thermoplastic polymer selected from the group consisting of thermoplastic elastomers, thermoplastic elastomers having copolymer structure, polyether amides, polyether esters, polyurethanes, styrene polymers, polyacrylates, polycarbonates, polyesters, polyethers, polyamides, polyether sulfones, polyether ketones, polyimides, polyvinyl chlorides, polyolefins, polyacrylonitriles, polyether sulfides, copolymers thereof and mixtures thereof.

10. The process according to claim 7, wherein in process step a) the foamable polymer (SP) provided is a thermoplastic polymer.

11. The process according to claim 7, wherein 0.2% to 20% by weight of a blowing agent is dissolved in the foamable polymer (SP) provided in process step a), based on the total weight of the foamable polymer (SP).

12. The process according to claim 7, which is conducted continuously.

13. The process according to claim 7, wherein the fiber/foam composite obtained in process step d) is infiltrated with resin in a further process step and/or the fiber/foam composite obtained has a proportion by volume of fibers in the range from 0.1% to 20% by volume, based on the total volume of the fiber/foam composite.

* * * * *